Aug. 17, 1954
R. O. JOHNSON
2,686,669
ROTO-ADJUSTER FOR CASEMENT WINDOWS
Filed Dec. 10, 1951
2 Sheets-Sheet 1
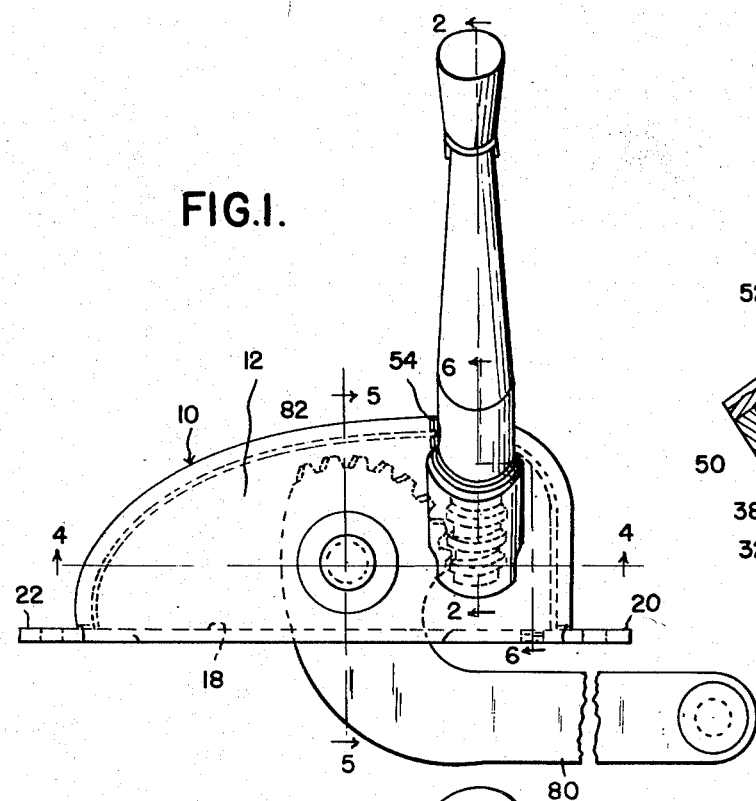
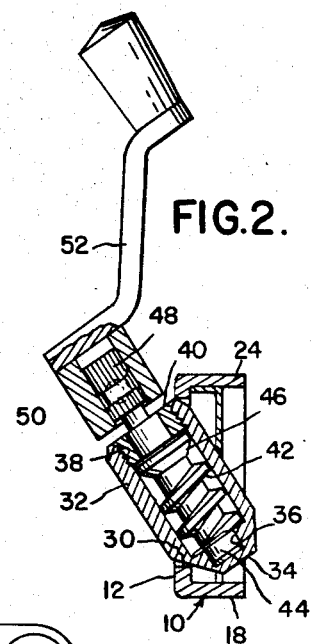
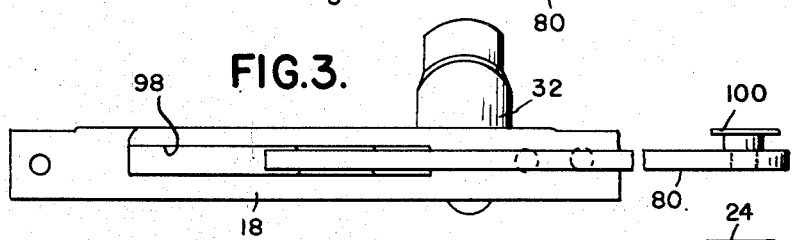
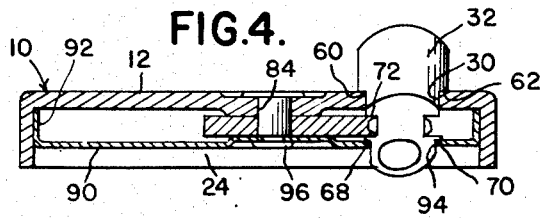
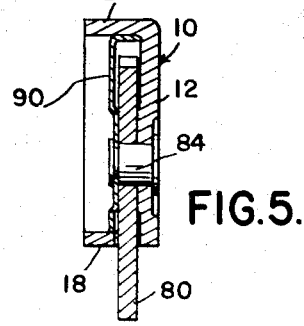
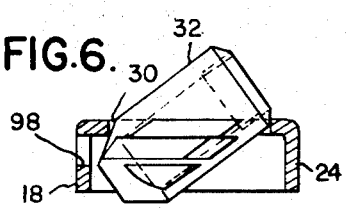
INVENTOR.
ROBERT O. JOHNSON
BY Whittemore,
Hulbert & Belknap
ATTORNEYS Aug. 17, 1954　　　R. O. JOHNSON　　　2,686,669
ROTO-ADJUSTER FOR CASEMENT WINDOWS
Filed Dec. 10, 1951　　　2 Sheets-Sheet 2

INVENTOR.
ROBERT O. JOHNSON
BY Whittemore,
Hulbert & Belknap
ATTORNEYS

Patented Aug. 17, 1954

2,686,669

UNITED STATES PATENT OFFICE 2,686,669

ROTO-ADJUSTER FOR CASEMENT WINDOWS

Robert O. Johnson, Erie, Pa., assignor to Detroit Steel Products Company, Detroit, Mich., a corporation of Michigan Application December 10, 1951, Serial No. 260,829

2 Claims. (Cl. 268—119)

The present invention relates to a roto-adjuster for casement windows.

It is an object of the present invention to provide a roto-adjuster for casement windows which is characterized by its attractive appearance, its rigidity, ease of operation, and the economy with which it may be produced.

More specifically, it is an object of the present invention to provide a roto-adjuster comprising a housing having an elongated slot through one wall thereof, a generally cylindrical tubular insert member extending through said slot obliquely to said surface, a worm in said insert member, said insert member having an obliquely extending slot through a side wall thereof within said housing, an actuating arm including a worm gear sector extending through the slot in said insert member into mesh with said worm and including an actuating arm extending outwardly through a slot in said housing.

It is a further object of the present invention to provide a roto-adjuster as described above which includes a closure plate located within the side walls of said housing and secured in position by attachment to a pivot stud on which the actuating arm is mounted.

Other objects and features of the invention will become apparent as the description proceeds, especially when taken in conjunction with the accompanying drawings, wherein:

Figure 1 is a top plan view of the adjuster.

Figure 2 is a section on the line 2—2, Figure 1.

Figure 3 is an elevational view of the adjuster.

Figure 4 is a section on the line 4—4, Figure 1.

Figure 5 is a section on the line 5—5, Figure 1.

Figure 6 is a fragmentary section on the line 6—6, Figure 1.

Figure 10:
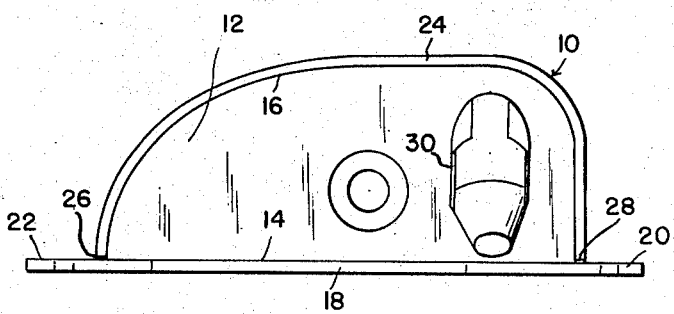
Figure 10 is a bottom plan view of the housing with the tubular insert member assembled therewith.

The adjuster for casement windows comprises a housing member 10 which is preferably formed as a stamping produced from flat metal. The housing 10 includes a generally flat wall 12 which as seen in Figures 1 and 10, has one straight edge portion 14 and a more or less continuously curved edge portion 16, which edge portions together define the shape of the flat wall 12. A depending flange 18 extends perpendicular to the plane of the flat wall 12 along the straight edge 14 and extends beyond the ends of the straight edge 14 to provide attaching ears 20 and 22. A second continuous flange 24 is provided which extends perpendicular to the plane of the wall 12 along the remainder of the edge of the flat wall 12. It will be observed in Figure 10 that the flange 24 has end portions 26 and 28 which are closely adjacent to the portions of the flange 18 at the ends of the straight edge 14.

Conveniently, the housing 10 may be formed by a stamping operation which greatly reduces the cost of the article. The flat wall 12 of the housing 10 is provided with an elongated slot or opening 30 and in this opening there is mounted a generally cylindrical tubular insert member 32, details of which are best seen in Figures 2 and 7-9. The insert member 32 is closed at one end as indicated at 34, the end being closed being provided with a bearing seat 36. The interior of the member 32 is generally cylindrical from the closed end thereof to the opposite open end, at which point the interior of the member is threaded as indicated at 38 for the reception of a bushing 40. It will be observed that the inner closed end of the member 32 is located generally within the housing 10 and the open end of the tubular member 32 is exposed above the surface of the flat wall 12 of the housing. Located within the tubular insert member 32 is a worm 42 having a cylindrical end portion 44 located within the bearing seat 36. The worm includes a shoulder 46 which engages under the bushing 40 whereby the worm is retained in the tubular member 32. The worm includes an outwardly extending portion 48 which is serrated or otherwise formed to cooperate with a sleeve 50 provided on an operating handle 52. The sleeve 50 may be clamped in place on the portion 48 of the worm by suitable means such as a set screw indicated at 54.

The tubular insert member is machined along its sides to provide diagonally extending flat surfaces 56 and 58, these flat surfaces providing shoulders 60 and 62 respectively which are adapted to seat on the upper surface of the flat wall 12, as best seen in Figure 4. In addition, the closed end of the tubular insert member is machined along diagonal paths to a greater depth to provide flat surfaces 64 and 66 providing shoulders 68 and 70 for a purpose which will presently be described.

The tubular insert member 32 is additionally machined to provide diagonally extending slots 72 and 74 which open into the generally cylindrical interior of the tubular insert member.

A window actuating arm 80 is provided having a worm gear sector 82 located within the housing 10. The arm 80 is mounted on a stud 84 secured to the flat wall 12 of the housing and the worm gear sector 82 extends through the adjacent slot 72 provided in the tubular member 32 and into mesh with the worm 42 therein.

The housing 10 is provided with a bottom cover or closure plate 90 which as best seen in Figure 4, is preferably formed of sheet metal and has upturned peripheral flanges 92 which engage within the flanges 18 and 24 of the housing. The closure plate 90 is in addition provided with an elongated slot 94 through which the lower end of the tubular insert member 32 extends, the slot being proportioned to permit passage of the opposed flat surfaces 64 and 66 of the tubular insert member and the shoulders 68 and 70 thereon serve as abutments for the edges of the slot 94.

The closure plate 90 is preferably retained in place in the housing by the stud 84 and as illustrated in Figure 4, the lower end of the stud is upset or riveted as indicated at 96 to retain the closure plate in position.

The straight flange 18 of the housing is provided with an elongated slot 98 through which the actuating arm 80 extends. At its free end the arm 80 is provided with attaching means 100 for connection to a casement type window.

Figure 9:
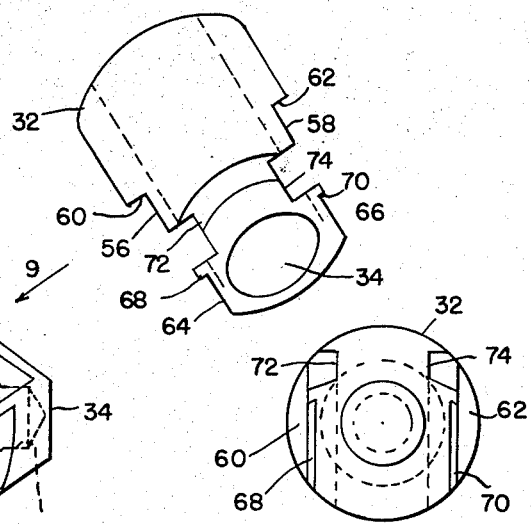
Figure 9 is a view of the insert member looking in the direction of the arrow 9, Figure 7.
Figure 7:
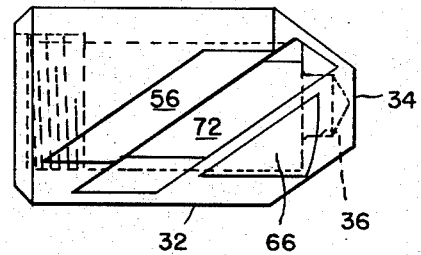
Figure 7 is a side elevation of the tubular insert member employed in the adjuster.
Figure 8:
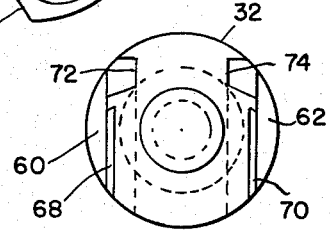
Figure 8 is an end view of the insert member shown in Figure 7.

It will be observed in Figure 9 that the tubular insert member is provided with obliquely extending slots 74 and 72 at both sides thereof. This arrangement permits the tubular element to be reversed for use in either right or left handed adjusting devices, to open vents which are hung with the hinges at the right or left side of the sash frame.

The drawings and the foregoing specification constitute a description of the improved roto-adjuster for casement windows in such full, clear, concise and exact terms as to enable any person skilled in the art to practice the invention, the scope of which is indicated by the appended claims.

What I claim as my invention is:

1. A roto-adjuster for casement windows comprising a housing having a flat top wall, depending side walls, and being open at its bottom, said top wall having an elongated straight sided opening therethrough, a generally tubular insert member disposed obliquely in said opening and having its inner end located beneath said top wall and an open outer end located above said top wall, said insert member having oppositely disposed flat side surfaces at the inner end thereof abutting the straight sides of the elongated opening in the top wall of said housing, and having shoulders extending obliquely to the axis of said insert located at the upper ends of said flat surfaces and engaging the upper surface of the flat top wall of said housing, the inner end portion of said insert member having a slot oblique to the axis thereof and extending parallel to the top wall of the housing within the housing, a worm in said insert, an operating handle connected to the upper portion of said worm gear, and a window actuating arm pivoted in said housing and extending therefrom, said arm having a worm gear sector received in said slot and meshing with said worm.

2. Structure as defined in claim 1 in which said insert member is provided with a pair of obliquely extending slots at opposite sides thereof to provide for assembly with housings designed for right and left hand swinging windows.

References Cited in the file of this patent

UNITED STATES PATENTS

| Number | Name | Date |
| --- | --- | --- |
| 2,050,403 | Weiner | Aug. 11, 1936 |
| 2,214,280 | Lang | Sept. 10, 1940 |
| 2,321,800 | Cordrey et al. | June 15, 1943 |
| 2,536,920 | Ducanis | Jan. 2, 1951 |